(12) United States Patent
Wise

(10) Patent No.: US 7,454,845 B2
(45) Date of Patent: Nov. 25, 2008

(54) TAPE MEASURE

(76) Inventor: Robert W. Wise, 365 Ely Rd., Petaluma, CA (US) 94954

( * ) Notice: Subject to any disclaimer, the term of this patent is extended or adjusted under 35 U.S.C. 154(b) by 0 days.

(21) Appl. No.: 11/786,656

(22) Filed: Apr. 11, 2007

(65) Prior Publication Data

US 2008/0250664 A1 Oct. 16, 2008

(51) Int. Cl.
*G01B 3/10* (2006.01)
(52) U.S. Cl. ........................................................ 33/758
(58) Field of Classification Search ................. 333/758, 333/755, 759, 760, 770
See application file for complete search history.

(56) References Cited

U.S. PATENT DOCUMENTS

| 14,947 | A | | 5/1856 | Buck et al. |
|---|---|---|---|---|
| 202,610 | A | | 4/1878 | Ward |
| 421,133 | A | * | 2/1890 | Grierson ........................ 33/768 |
| 736,052 | A | | 9/1903 | Adamson |
| 1,006,056 | A | | 10/1911 | Bowers |
| 1,469,944 | A | | 10/1923 | Merrill |
| 1,624,779 | A | | 4/1927 | De Camp et al. |
| 1,677,821 | A | | 7/1928 | Graham |
| 1,860,634 | A | | 5/1932 | Synk |
| 1,876,744 | A | * | 9/1932 | Posgate ........................ 33/770 |
| 1,936,998 | A | | 11/1933 | Summers |
| 2,262,664 | A | | 11/1941 | Bresson |
| 2,770,883 | A | | 11/1956 | Hackney |
| 2,778,118 | A | | 1/1957 | Manville |
| 3,004,346 | A | | 10/1961 | Quenot |
| 3,336,674 | A | | 8/1967 | Higgins et al. |
| 3,409,988 | A | | 11/1968 | Zelnick |
| 4,574,486 | A | | 3/1986 | Drechsler |
| 4,827,622 | A | * | 5/1989 | Makar ........................ 33/770 |
| 4,907,348 | A | | 3/1990 | Hubbard, Jr. |
| 5,062,215 | A | | 11/1991 | Schlitt |
| D342,210 | S | | 12/1993 | Grossman |
| 5,367,785 | A | | 11/1994 | Benarroch |
| 5,542,184 | A | * | 8/1996 | Beard ........................... 30/293 |

(Continued)

FOREIGN PATENT DOCUMENTS

FR 2 627 856 10/1988

(Continued)

*Primary Examiner*—Christopher W Fulton
(74) *Attorney, Agent, or Firm*—Black Lowe & Graham PLLC

(57) ABSTRACT

A tape measure includes a housing and a tape retractably coupled to the housing. The tape has an upper surface, a lower surface, and a free end onto which an end clip is moveably coupled. The end clip includes a first attachment portion and a first flange extending therefrom. In addition, an intermediate clip is fixedly coupled to the tape. The intermediate clip includes a second attachment portion and a second flange extending from second attachment portion. The second flange includes a flange face located one measurement unit from the free end of the tape. The end clip cooperates with a set of first measurement markings applied to the tape to provide linear measurements. Whereas, the intermediate clip cooperates with a set of second measurement markings applied to the tape. The set of second measurements markings commence at one measurement unit from the free end of the tape. In addition, the tape measure may include reverse marking applied to the back side of the tape. The reverse measurement markings cooperate with the intermediate clip and can be used in specialty trades.

24 Claims, 4 Drawing Sheets

U.S. PATENT DOCUMENTS

| | | |
|---|---|---|
| 5,894,677 A | 4/1999 | Hoffman |
| 5,895,539 A | 4/1999 | Hsu |
| 6,101,734 A | 8/2000 | Ten Caat et al. |
| 6,108,926 A | 8/2000 | Fraser et al. |
| 6,115,931 A | 9/2000 | Arcand |
| RE36,887 E | 10/2000 | Goldman |
| 6,212,787 B1 | 4/2001 | Dixon |
| 6,237,243 B1 | 5/2001 | Cook |
| 6,935,045 B2 | 8/2005 | Cubbedge |
| 2002/0017031 A1* | 2/2002 | Tarver ......................... 33/759 |
| 2003/0009899 A1* | 1/2003 | Ha ............................. 33/770 |
| 2003/0019116 A1* | 1/2003 | DeWall ........................ 33/42 |
| 2003/0154617 A1* | 8/2003 | Ricalde ...................... 33/770 |
| 2004/0172846 A1* | 9/2004 | McRae ....................... 33/760 |

FOREIGN PATENT DOCUMENTS

| | | |
|---|---|---|
| GB | 2 078 960 A | 1/1982 |
| GB | 2 186 692 A | 8/1987 |

* cited by examiner

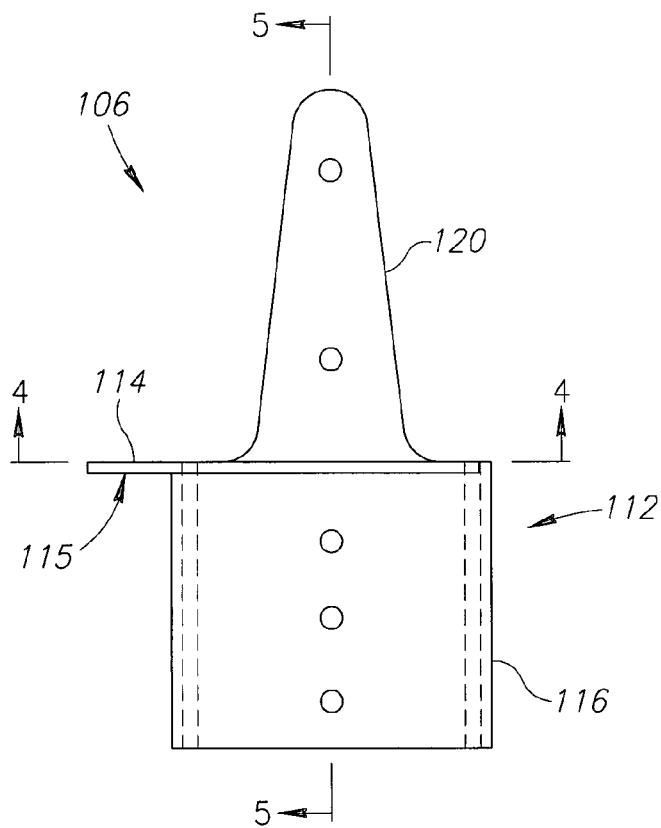
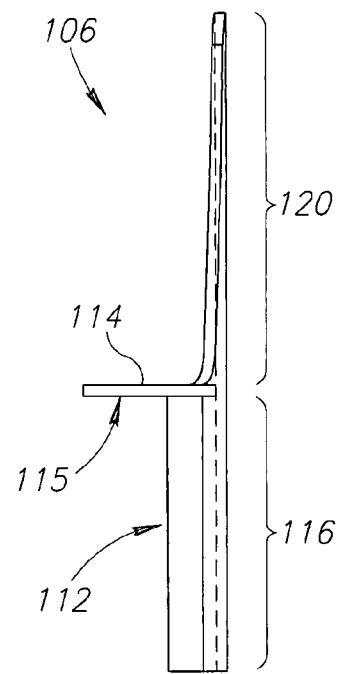
FIG.3  FIG.5
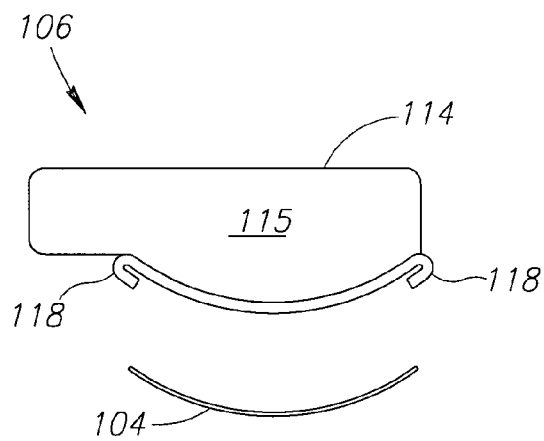
FIG.4

TAPE MEASURE

FIELD OF THE INVENTION

This invention relates generally to tape measures configured to provide at least two different methods of taking measurements. More specifically, the invention relates to tape measures having two different origins for mensurations.

BACKGROUND OF THE INVENTION

Tape measures are used for a variety of purposes. One conventional type of a tape measure is designed for carpentry or construction and employs a resilient, curved metallic tape that can remain stiff and straight when extended, but retracts into a coil for convenient storage into a handheld housing. The tape of the tape measure includes markings for linear measurements. These conventional tape measures have a floating tang or clip on the end of the tape to aid measuring. The tang is typically attached to the end of the tape with rivets received in ovalized holes in the tape so as to permit the tang to float a distance equal to its thickness. This floating attachment allows for a fairly accurate measurement whether the tape is in tension or compression. That is, when used to measure an interim dimension, the tang is butted up against an interim surface (e.g., a wall) and the measurement is read off the tape with the thickness of the tang having been compensated for by the oval ized holes, when an extension measurement is made (e.g. the length of a board) the tang extends outwardly so that the origin of the measurements is now over the inner surface of the tang. Again, the ovalized holes allow the tang to move out a distance equal to and compensating for the tang thickness.

One drawback of such conventional tape measures is that the tang can become damaged or bent. Another drawback is that the rivet holes in the tape may become excessively ovalized, especially after repeated usage, and the accuracy of the measurement deteriorates. This is generally not a problem for measurements with tolerances of ±⅛", but may be a problem for measurements requiring greater accuracy, e.g., ±¹⁄₁₆").

One method employed in the construction trades to account for this loss of accuracy is to "burn an inch." Burning an inch in construction is typically done to improve accuracy because practitioners tend not to trust the accuracy of the floating tang or clip, regardless of whether it has become worn or damaged. Burning an inch simply means starting the measurement at the "one inch" marking of the tape instead of at "zero" marking, which is where the tang is located. One error that may occur, however, is that the practitioner forgets about the "one inch" that was burned and ends up one inch short when subsequently cutting material.

Accordingly, a need exists for a practical and efficient tape measure that overcomes at least some of the aforementioned drawbacks.

SUMMARY OF THE INVENTION

It is therefore another objective of the present invention to provide a multi-purpose tape measure for taking a variety of measurements.

It is therefore yet another objective of the present invention to provide tape of a tape measure that permits a practitioner to "burn an inch" when taking measurements without having to remember that the inch was burned.

It is therefore still yet another objective of the present invention to provide a clip fixedly attached to a tape of a tape measure that permits a practitioner to obtain more accurate measurements compared to measurements taken from a conventional floating clip.

The present invention achieves the above objects and advantages, and other objects and advantages that will become apparent from the following description, by providing a tape measure having a housing and a tape retractably coupled to the housing. The tape has an upper surface, a lower surface, and a free end onto which an end clip is moveably coupled. The end clip includes a first attachment portion and a first flange extending therefrom. In addition, an intermediate clip is fixedly coupled to the tape. The intermediate clip includes a second attachment portion and a second flange extending from second attachment portion. The second flange includes a flange face located one measurement unit from the free end of the tape. The end clip cooperates with a set of first measurement markings applied to the tape to provide linear measurements. Whereas, the intermediate clip cooperates with a set of second measurement markings applied to the tape. The second set of measurement markings commence one measurement unit from the free end of the tape.

As will be readily appreciated from the foregoing summary, the invention provides a tape measure having markings that operate with an end clip and an intermediate clip to provide various ways of taking linear measurements. More specifically, the end clip is configured to provide accurate measurements reduce operator error when a practitioner desires to burn an inch.

BRIEF DESCRIPTION OF THE DRAWINGS

FIG. 3 is a top, plan view of the intermediate clip of FIG. 2;

FIG. 4 is a cross-sectional view of the intermediate clip taken along line 4-4 of FIG. 2;

FIG. 5 is a cross-sectional view of the intermediate clip taken along line 5-5 of FIG. 2;

DETAILED DESCRIPTION OF THE PREFERRED EMBODIMENTS

In general, a retractable tape measure includes a retractable tape in a housing, which includes a mechanism for retracting the tape through a housing opening. The tape measure also includes an end stop for preventing the free end of the tape from retracting into the housing and a lock mechanism to lock the tape in an extended position. The tape itself typical includes indicia or markings along the surface of the tape that will be viewed by a practitioner using the tape. In order to provide bending stiffness to the tape, the tape is usually manufactured with a lateral cross-section curvature in which the edges of the tape are turned upward. In the various figures of the attached drawings, the numbered elements in the figures correspond to like numbered elements herein.

Figure 1:
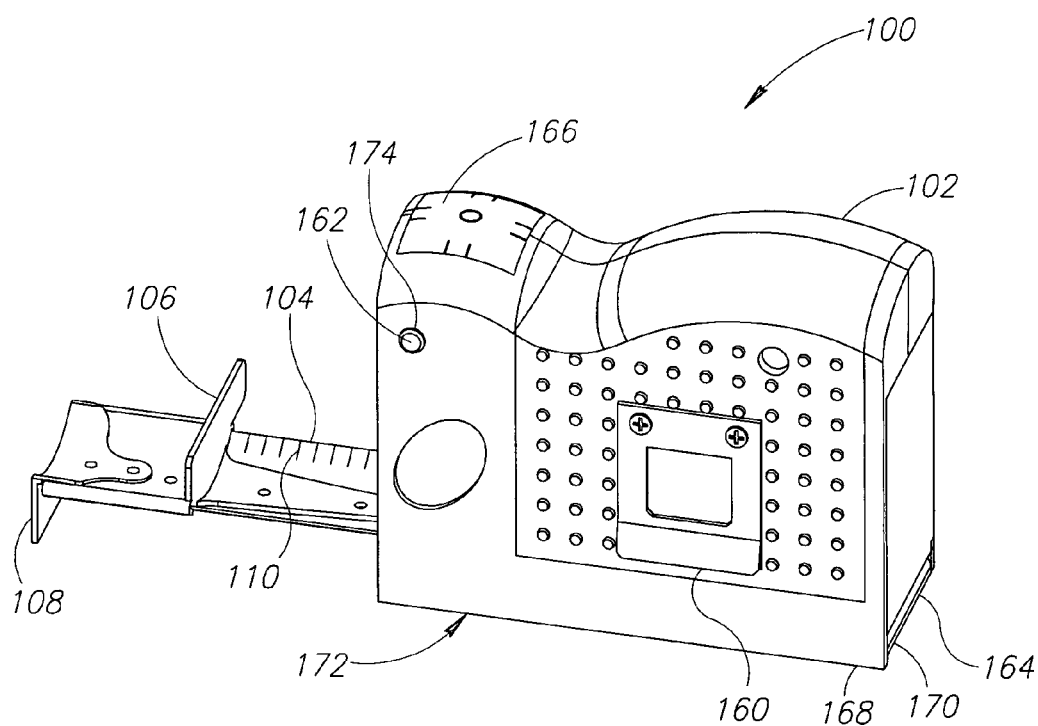
FIG. 1 is a top, left isometric view of a tape measure in accordance with an embodiment of the invention.
Figure 2:
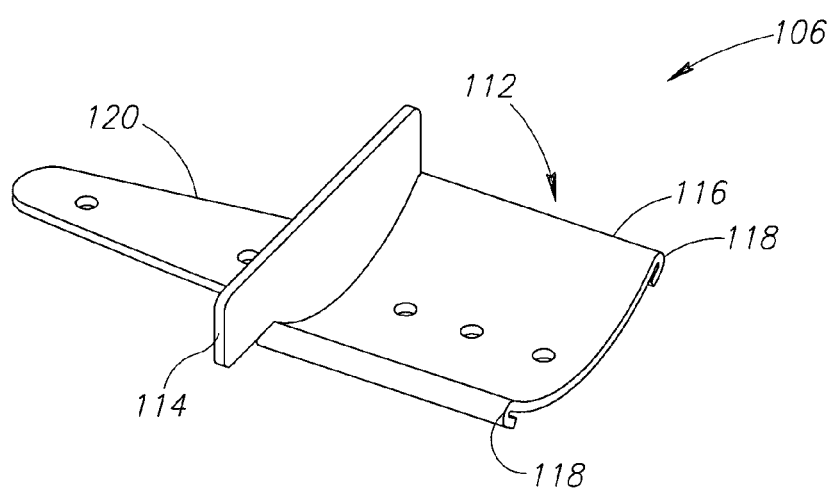
FIG. 2 is a top, left isometric view of an intermediate clip that is fixedly attached to the tape measure of FIG. 1 for achieving more accurate measurements.

FIG. 1 shows a tape measure 100 having a housing 102 and a tape 104 with fixed, intermediate clip 106 and floating end clip 108 attached thereto. In addition, the tape 104 includes indicia or markings 110 for taking measurements, for example linear measurements. The tape 104 may be made from metal, plastic, or some other material. But, preferably the tape should have sufficient stiffness to be extended over long distances and maintain its shape. The clips 106 and 108 and an arrangement of the indicia 110 on the tape 104 will be discussed in much more detail below.

The tape measure 100 may further include a number of mechanisms or assemblies within the housing, for example a mechanism for retracting the tape 102 and a lock assembly for locking the extend tape 102 at a desired position. These mechanisms and assemblies are well known in the art.

FIGS. 2-5 show that the intermediate clip 106 allows a practitioner to accurately and repeatedly "burn an inch," which is a practice done in many trades. As discussed above, burning an inch is generally done for accuracy because the moveable end clips may eventually become damaged, bent, or the attachment holes in the tape become too ovalized.

The intermediate clip 106 includes a tape attachment portion 112 and a flange 114 extending from the tape attachment portion 112. The tape attachment portion 112 is preferably curved to complement on the curvature of the tape 104. The tape attachment portion 112 includes a first portion 116 having edge portions 118 that are bent or rolled under to receive the tape 104. The edge portions 118 may be crimped, bonded, or both onto the tape 104 so this in contrast to the floating end clip 108, the intermediate clip 106 is fixedly attached to the tape 104 in a non-floating manner. The tape attachment portion 112 further includes a second portion 120 coupled to the first portion 116 as best seen in FIG. 5. The tape attachment portion 112 further includes openings for fastening the intermediate clip 106 to the tape 104.

The flange 114 is fixed to the tape attachment portion 112 by welding, bonding, or some other equivalent joining technique. The flange 114 extends from the tape attachment portion 112 at the location where the first portion 116 and the second portion 120 are joined. The flange includes a first face 115, which abuts an object when measurements of the object are taken. In another embodiment, the first and second portions 116, 120 of the tape attachment portion 112 and the flange 114 may be integrally formed through a molding process.

Figure 6:
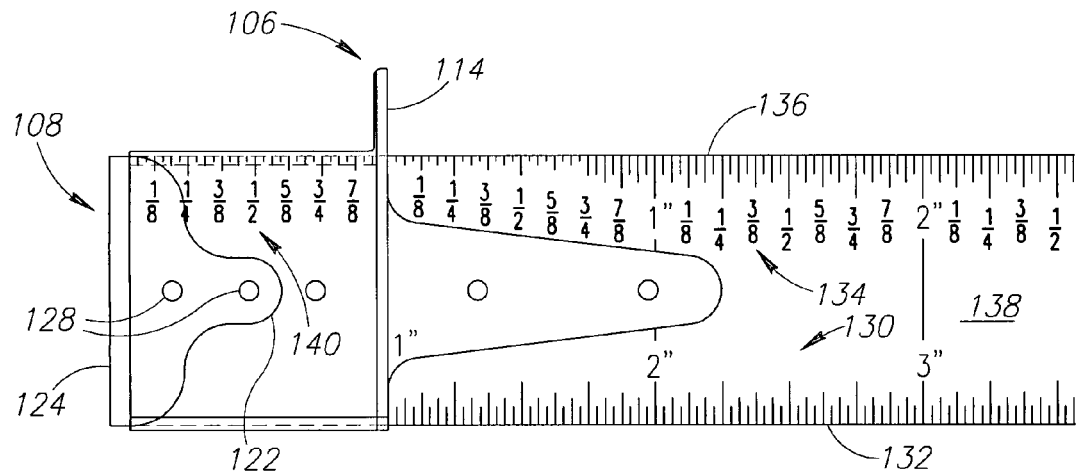
FIG. 6 is a top, plan view of a measuring tape having several sets of markings that may be used in conjunction with an end clip or an intermediate clip according to the illustrated embodiment.
Figure 7:
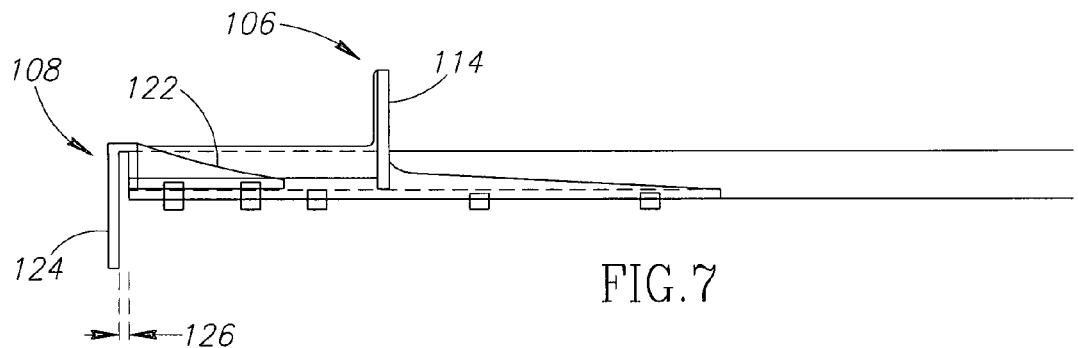
FIG. 7 is a side elevational view of the measuring tape of FIG. 6.
Figure 8:
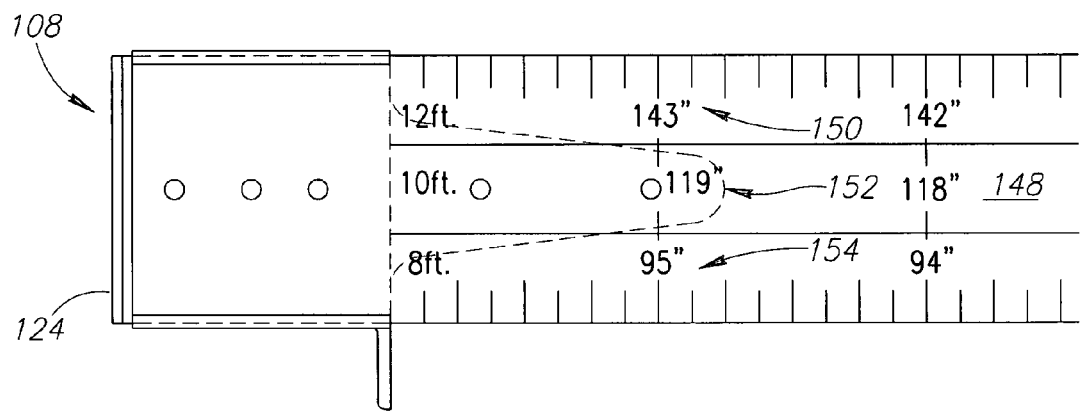
FIG. 8 is a bottom plan view of the measuring tape of FIG. 6.

FIGS. 6-8 show the tape 104 with the clips, 106, 108 riveted with rivets 109 to the tape 104 according to one embodiment. In addition, these figures show one example of the indicia 110 that may be marked on the tape 104 and used in cooperation with one or both clips 106, 108.

The end clip 108 has a tape attachment portion 122 and a flange 124 extending from the attachment portion 122. The tape attachment portion 122 and the flange 124 may be integrally joined as a one-piece clip 108 or may be joined by welding, bonding, or some other equivalent technique. The tape attachment portion 122 is longitudinally moveably coupled to the tape 100 such that the clip 108 is able to float by an amount equal to a thickness 126 of the flange 124 in the conventional manner. The floating of the end clip 108 relative to the tape 104 permits the practitioner to account for internal and external measurements. The tape attachment portion 122 has openings 128 arranged for fastening the end clip 106 to the tape 104 and to the clip 108. As best seen in FIG. 7, the flange 114 of the intermediate clip 106 and the flange 124 of the end clip 108 extend in opposite directions with respect to the tape 104.

Referring to FIG. 6, there is a first set of indicia or markings 130 provided along a first side portion 132 and a second set of indicia or markings 134 (i.e., "burn an inch markings") provided along a second side portion 136 of the tape 104. The markings 130, 134 are provided on atop surface 138 of the tape 104. The markings 130 are conventional markings for taking measurements while employing the end clip 108. The markings 130 are shown in English units (inches and fractions of an inch). But, it is appreciated that the markings 130 could be provided in other units, such as Standard International (SI) units.

The markings 134 commence at the intermediate clip 106 and incrementally increase in a direction away from a free end of the tape 104. In addition, there are markings 138 between the free end of the tape 104 and the intermediate clip 106 for taking accurate measurements of small objects. In the illustrated example of FIG. 6, the markings 140 are provided in increments of ⅛ of an inch, but it is appreciated that other increments may be used.

Figure 9:
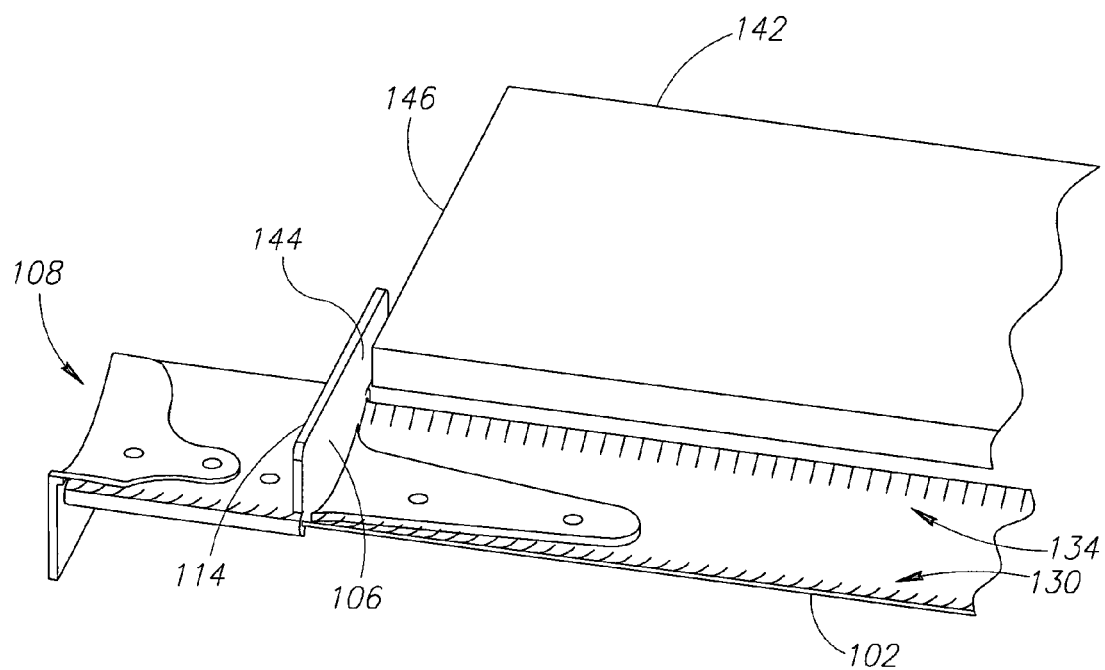
FIG. 9 is a perspective view of the measuring tape of FIG. 6 being used to make a cut-mark on a workpiece according to the illustrated embodiment.

Referring to FIG. 9, the operation of the intermediate clip 106 in combination with the markings 134 is best shown through an example like the need to accurately measure and cut a piece of wood 142 to be used in a furniture piece. The practitioner hooks a tab portion 144 of the intermediate clip 106 onto an end 146 of the piece of wood 142 and then pulls the tape 104 out of the housing 102 to a desired distance, say 42 and ¼ inches. The practitioner can then simply make a cut-mark at 42 and ¼ inches down the tape 104. Thus, the intermediate clip 106 in combination with the markings 134 permits the practitioner to burn an inch and not have to remember that the inch was burned. Without the intermediate clip 106, the practitioner would somehow have to hold the tape 104 such that the "one inch" marking was lined up with the end of the piece of wood and remember to make the cut-mark at 43 and ¼ inches to account for the "burned inch." If the practitioner mistakenly made the cut-mark at 42 and ¼ inches, then the piece of wood would end up being short by one inch.

Referring back to FIG. 8, a bottom surface 148 of the tape 104 is shown with a first set of markings 150, a second set of markings 152, and a third set of markings 154. These markings also cooperate with the intermediate clip 106 and are provided in reverse order, highest to lowest. One purpose of the markings 150, 152, and 154 is to advantageously measure large, standard items, such as drywall, without having to pull the tape 104 a far distance out of the housing 102. For example, drywall typically comes in sheets of 8, 10, or 12 feet. Thus, if a drywall installer has an 8 foot section of drywall and needs to mark and cut it to be 7 and ½ feet, then the drywall installer hooks a raised portion 156 (FIG. 9) of the intermediate clip 106 onto an end of the drywall and pulls the tape 104 out by only 6 inches (½ foot). Accordingly, the markings 150, 152, and 154 advantageously permit the installer to make quicker and more accurate measurements.

In addition to the aforementioned features and advantages of the tape measure 100, it may further include a number of auxiliary mechanisms to make the tape measure 100 multifunctional for a variety of purposes. By way of example, the tape measure 100 may include a belt clip 160, an integral stud finder 162 with a light emitting diode (LED), a combination square 164, and a bubble level 166. In one embodiment, the combination square 164 includes a side guide 168 that operates with a rear guide 170 for marking a straight line on piece of material. Alternatively stated, the side guide 168 may be placed adjacent an edge of material being measured so that a square or straight line may be drawn using the rear guide 170 positioned at a marked length. The stud finder 162 is built into the tape measure 100 and includes a stud sensing mechanism 172 located near a bottom region of the tape measure 100, and the stud sensing mechanism 172 is electrically coupled to an indicator 174, such as an LED indicator. It is appreciated that the stud sensing mechanism 172 may be configured and function as other stud sensing mechanisms commonly known in the art. The stud finder 162 advantageously provides a user the convenience of laying out penetrations through sheetrock and quickly verifying the existence of studs or other substrate behind the sheetrock. By way of example, if the user laid out the penetrations to correspond to 16 inch studs as measured "on center," the user could verify the location of the studs behind the sheetrock with the stud finder 162. The tape measure 100 may include all, some, or none of these items. This list is not meant all inclusive, but is provided as an example of how the tape measure 100 could be multi-functional. It is appreciated that other mechanisms, not mentioned above, could be included in the tape measure 100.

While the preferred embodiment of the invention has been illustrated and described, as noted above, many changes can be made without departing from the spirit and scope of the invention. For example, in some embodiments the clips may take different shapes, may be attached to the tape in a variety of ways, and the measurement markings may be in different units. Accordingly, the scope of the invention is not limited by the disclosure of the preferred embodiment. Instead, the invention should be determined entirely by reference to the claims that follow.

I claim:

1. A mensuration tape for a retractable tape measure for measuring a linear dimension of an object comprising:
    a retractable tape member having a first tape surface, an obverse second tape surface, and a free end;
    an end clip having a first attachment portion moveably coupled to the tape member and a first flange extending from the first attachment portion;
    an intermediate clip having a second attachment portion rigidly coupled to the tape member and a second flange extending therefrom, the second flange having a flange face located one measurement unit from the free end of the tape member;
    a plurality of first measurement markings applied to the first tape member surface, the plurality of first measurement markings cooperatively arranged with the end clip to provide linear measurements; and
    a plurality of second measurement markings applied to the second tape member surface and arranged to cooperate with the intermediate clip to provide increased accuracy when taking measurements relative to the intermediate clip.

2. The mensuration tape of claim 1, wherein the first measurement markings are referenced with respect to a first origin.

3. The mensuration tape of claim 2, wherein the second measurement markings are referenced with respect to a second origin.

4. The mensuration tape of claim 3, wherein the first and second measurement markings are applied along the first tape surface and the second origins are displaced by one measurement unit.

5. The mensuration tape of claim 4, wherein the first and second measurement markings are viewable by a practitioner when the tape is used for measuring the linear dimension of the object.

6. The mensuration tape of claim 1, wherein the first flange of the end clip extends substantially perpendicular from the first attachment portion of the first clip.

7. The mensuration tape of claim 1, wherein the second flange of the intermediate clip extends substantially perpendicular from the second attachment portion of the intermediate clip.

8. The mensuration tape of claim 1, wherein the first flange of the end clip extends in a direction opposite that of the intermediate clip.

9. The mensuration tape of claim 1, wherein one of the tape surfaces includes a set of linear measurement markings in reverse order with a maximum measurement unit located one measurement unit from the free end of the tape member.

10. The mensuration tape of claim 1, wherein the first attachment portion and the first flange of the end clip are integrally formed as a one-piece clip.

11. The mensuration tape of claim 1, wherein the second attachment portion and the second flange of the intermediate clip are integrally formed as a one-piece clip.

12. A tape measure comprising:
    a housing;
    a tape retractably coupled to the housing, the tape having a first tape surface, a second tape surface, and a free end;
    an end clip having a first attachment portion and a first flange extending from the first attachment portion, the first attachment portion moveably coupled to the tape;
    an intermediate clip having a second attachment portion and a second flange extending from second attachment portion, the second attachment portion rigidly coupled to the tape, the second flange extending from second attachment portion and having a flange face located one measurement unit from the free end of the tape;
    a plurality of first measurement markings applied to one of the first tape surface or the second tape surface of the tape, the plurality of first measurement markings are arranged to cooperate with the end clip to provide linear measurements;
    a plurality of second measurement markings applied to one of the first tape surface or the second tape surface of the tape, wherein the plurality of second measurement markings are arranged to cooperate with the intermediate clip to provide for increased accuracy when taking measurements.

13. The tape measure of claim 12 wherein the plurality of first measurement markings are applied adjacent a first side of the first tape surface and the plurality of second measurement markings are applied adjacent a second side of the first tape surface.

14. The tape measure of claim 12 wherein the first tape surface is viewable by a practitioner when the tape is used for measuring a linear dimension of an object.

15. The tape measure of claim 12 wherein the first attachment portion of the end clip is moveably coupled to the tape to account for internal and external measurements.

16. The tape measure of claim 12 wherein the first flange of the end clip extends substantially perpendicular from the first attachment portion of the end clip.

17. The tape measure of claim 12 wherein one of the first or second tape surfaces includes at least one set of linear measurement markings in reverse order with a maximum measurement unit located at one measurement unit from the free end of the tape.

18. The tape measure of claim 12 wherein the first attachment portion and the first flange of the end clip are integrally molded to form a one-piece clip.

19. The tape measure of claim 12 wherein the second attachment portion and the second flange of the intermediate clip are integrally molded to form a one-piece clip.

20. The tape measure of claim 12, further comprising a combination square coupled to the housing.

21. The tape measure of claim 12, further comprising a stud finder located within the housing.

22. A clip attachable to a tape of a tape measure, the clip comprising:

an attachment portion having a plurality of openings through which the attachment portion is coupled to the tape, the attachment portion further having end portions configured to slideably receive the tape, a flange having a flange face, the flange extending from the attachment portion, wherein the flange face is located exactly one measurement unit from a free end of the tape when the attachment portion is fixedly coupled to the tape.

23. The clip of claim 22 wherein the flange face cooperates with a first set of measurement markings on the tape and the flange face cooperates with a second set of measurement markings on the tape.

24. The clip of claim 22 wherein the flange extends substantially perpendicular from the attachment portion of the clip.

* * * * *